United States Patent [19]

Smith et al.

[11] 4,204,181

[45] May 20, 1980

[54] ELECTRICAL COIL, INSULATED BY CURED RESINOUS INSULATION

[75] Inventors: James D. B. Smith, Wilkins Township, Allegheny County; Robert N. Kauffman, Monroeville, both of Pa.

[73] Assignee: Westinghouse Electric Corp., Pittsburgh, Pa.

[21] Appl. No.: 956,125

[22] Filed: Oct. 30, 1978

Related U.S. Application Data

[62] Division of Ser. No. 680,633, Apr. 27, 1976, Pat. No. 4,137,275.

[51] Int. Cl.² .................................... H01F 27/32
[52] U.S. Cl. .................................... 336/96; 310/43; 310/208; 336/205
[58] Field of Search .................. 260/830 TW; 310/43, 310/208; 336/96, 205

[56] References Cited

U.S. PATENT DOCUMENTS

| | | | |
|---|---|---|---|
| 3,336,552 | 8/1967 | Davis | 336/96 |
| 3,424,699 | 1/1969 | Stark et al. | 528/87 |
| 3,624,032 | 11/1971 | Miyashiro et al. | 528/107 |
| 3,626,022 | 12/1971 | Suzuki et al. | 260/830 TW |
| 4,113,791 | 9/1978 | Smith et al. | 336/96 X |

*Primary Examiner*—Leland A. Sebastian
*Attorney, Agent, or Firm*—D. P. Cillo

[57] ABSTRACT

A highly fluid, solventless, resinous, impregnating and coating composition, suitable as a high voltage insulation for electrical members, is made from an admixture containing: 100 parts of an epoxy resin, about 25 to 200 parts of an acid anhydride reactive with the epoxy resin, and about 0.002 to 1.00 part of a selected metal acetylacetonate, acting as a latent accelerator.

7 Claims, 3 Drawing Figures

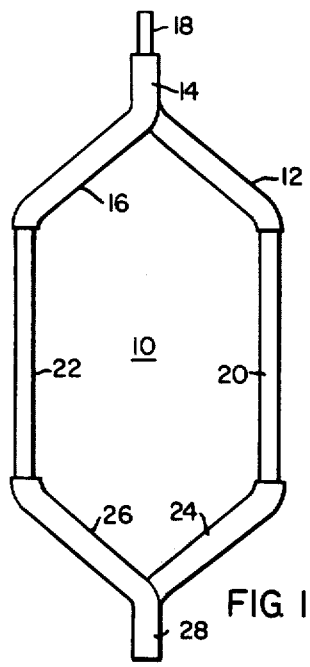
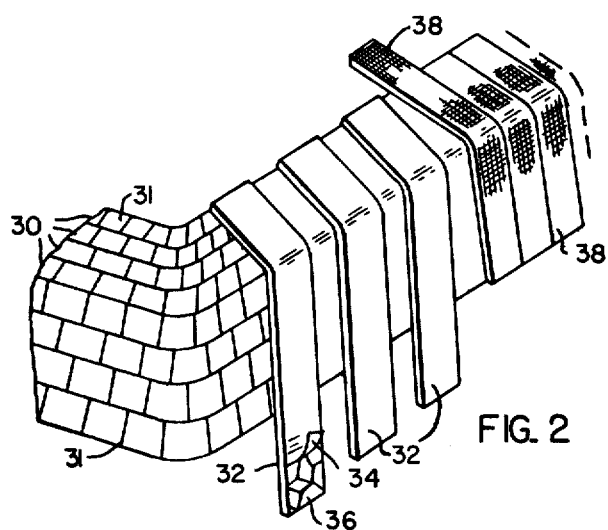
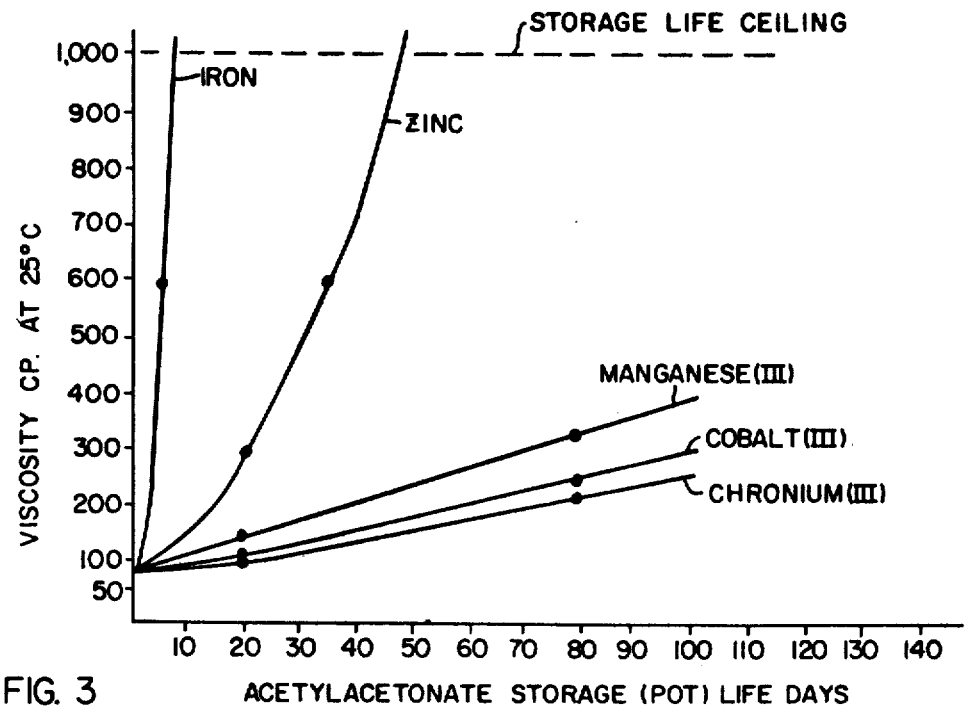
FIG. 1
FIG. 2
FIG. 3

ELECTRICAL COIL, INSULATED BY CURED RESINOUS INSULATION

This is a division of application Ser. No. 680,633, filed Apr. 27, 1976, now U.S. Pat. No. 4,137,275.

BACKGROUND OF THE INVENTION

To improve high temperature stability and to give better physical and electrical properties over amine cured epoxy resin systems, it has been the general practice in the epoxy technological field to use anhydride curing agents with epoxy resins, particularly for high voltage insulation applications. Most epoxy-anhydride formulations require elevated-temperature cures, and for most commercial applications it is necessary to add some material to speed the rate of cure. Consequently, a considerable amount of effort has been devoted in recent years to develop a perfect catalyst or accelerator for curing epoxy resins, especially those used for high voltage coil insulation, i.e., over about 7,000 volts. In high voltage coils, only an absolute minimum of voids can be tolerated in the resinous insulation. Therefore, the applied resin impregnating composition must be extremely fluid, solventless, and capable of a very fast gel, so that resin will not easily drain from a coil during curing.

The properties desired of such a catalyst or accelerator are: it should be inexpensive and readily available; it should gel the epoxy resin system at times below 50 minutes and preferably below 35 minutes at about 135° C. to 175° C.; it should be completely soluble with the epoxy resin-anhydride system at all temperatures; the initial viscosity of the catalyzed resin system should be below about 350 cps. at 25° C.; the storage life of the catalyzed resin system should be over at least 80 days and preferably about 180 days at 25° C., i.e., the viscosity should remain below about 1,000 cps. during that period; it should not adversely affect the mechanical properties of the cured resin system; after cure, the resin system should have power factor values of below about 30% at 150° C.

Several latent catalysts have appeared on the commercial scene in recent years. Included are quaternary ammonium halides such as benzyltrimethyl-ammonium chloride, stannous octoate, "extra-coordinate" siliconate salts, triethanolamine borate, triethanolamine titanate and various other metal chelates. However, all of these materials failed to meet all of the above described requirements and have been rejected.

Smith, in U.S. Pat. No. 3,784,583, taught the use of a quaternary organic phosphonium salt, as a latent catalyst, for a solventless, highly fluid, resinous, epoxy-anhydride impregnating composition. While the phosphonium salt combined superior gel times with excellent pot life, i.e., good latent catalytic activity, and good electrical properties, the latent catalyst was not readily available.

Starck et al, in U.S. Pat. No. 2,801,228, used from 5 to 40 wt.% of metallic salts of enol-keto tautomers including nickel acetylacetone, as a curing-hardener substitute for amines and anhydrides, in epoxy resins. Naps, in U.S. Pat. No. 2,876,208, used from 0.1 to 20 wt.% of copper acetylacetone, as a stabilizer, in phenolic-epoxy resin systems.

Markovitz, in U.S. Pat. No. 3,812,214, taught catalytic cures of relatively viscous, epoxy resin systems, having initial viscosities of about 375 cps. to 1,200 cps. at 25° C., by using up to 20 wt.% of a combination phenolic resin accelerator-metal acetylacetone catalytic hardener. Markovitz eliminated anhydride curing agents, and substituted phenolic resin accelerators and the use of up to 5 wt.% of metallic acetylacetonates. The useful acetylacetonates could contain essentially any metal anion, were readily available commercially, and were characterized as providing a superior pot life over systems containing anhydrides or boron trifluoride amine curing agents.

Epoxy-anhydride systems are still very useful. What is needed is an improved epoxy resin system, which still contains anhydride curing agents, but which will have good pot life and electrical properties. The epoxy-anhydride system should be very fluid, i.e., initially below about 350 cps. at 25° C., to ensure its usefulness as an impregnating composition for high voltage applications, where complete coil impregnation is critical.

SUMMARY OF THE INVENTION

It has been discovered that only selected metal acetylacetonates will behave as latent accelerators for epoxy resins, when used in certain weight proportions with an acid anhydride reactive with the epoxy resin. The effective weight ratio of epoxy resin:acid anhydride:metal acetylacetonate is 100:25 to 200:0.002 to 1.00. Preferably the resin will consist of a low viscosity epoxy:high viscosity epoxy mixture having a weight ratio of from about 1.0:0.0 to about 1.0:4.0.

The useful metal acetylacetonates are selected from the group consisting of chromium (III) acetylacetonate, which is the preferred material, titanyl (TiO) acetylacetonate, aluminum (III) acetylacetonate, manganese (III-manganic) acetylacetonate, cobalt (II) acetylacetonate, cobalt (III) acetylacetonate, nickel (II) acetylacetonate, vanadium (III) acetylacetonate, zirconium (IV) acetylacetonate, sodium (I) acetylacetonate, potassium (I) acetylacetonate and mixtures thereof. This provides an impregnating and casting composition having an initial viscosity of up to about 350 cps. at 25° C.

Excellent storage properties at ambient temperatures have been found, i.e., storage lifetimes of at least 80 days up to 1,000 cps. at 25° C., consequently, long life resin formulations employing these latent accelerators are possible. Electrical measurements on the cured system show very low dielectric constants and power factor values even at temperatures up to 150° C. The epoxy-anhydride compositions utilizing these selected metal acetylacetonates are particularly useful as compositions which can be applied to and easily impregnate electrical coil windings used in insulated high voltage electrical motors, and generators, particularly those having mica wrapped ground walls and multiple layers of mica insulation. It is also a useful potting or casting compound for transformers.

BRIEF DESCRIPTION OF THE DRAWINGS

For a better understanding of the invention, reference may be made to the preferred embodiments, exemplary of the invention, shown in the accompanying drawings, in which:

FIG. 1 is a plan view of a closed full electrical coil member having two slot portions;

FIG. 2 is a fragmentary view in perspective, showing part of a high voltage coil comprising a plurality of turns of conductors wound with twin insulation and bound together with mica tape as ground insulation, covered with a porous bonding tape; and FIG. 3 is a graph of the viscosity of various resin formulations vs. their storage time.

DESCRIPTION OF THE PREFERRED EMBODIMENTS

It has been found that selected metal acetylacetonates are particularly effective latent accelerators for the anhydride cure of epoxy coating compositions used in impregnating and encapsulating the coils of high voltage capability electrical devices. At concentrations of about 0.002 to 1.00 part latent accelerator per 100 parts epoxy resin, rapid gel times in the temperature range of 125° C. to 175° C. are possible. The term "latent accelerator" is taken to mean the ability of certain selected metal acetylacetonates to speed up curing rates of epoxy-anhydride systems at elevated temperatures (e.g. over 100° C.) while exhibiting little or no cure at room temperature, thus giving good storage properties.

The useful metal acetylacetonates of the present invention can be characterized by the following structural formula:

where n is 1 to 4, corresponding to the ionic charge on the metallic atom. M can be chromium (III), which is preferred, titanium oxide, aluminum (III), manganese (III-manganic), cobalt (II), cobalt (III), nickel (II), vanadium (III), zirconium (IV), sodium (I) and potassium (I). These selected acetylacetonates can be used alone or in mixtures.

A great number of metal acetylacetonates are not useful in epoxy-anhydride systems, providing either very poor power factor values, long gel times, or very poor solubility in the resinous system. Included among the nonuseful metal acetylacetonates are cerous acetylacetonate, manganese (II-manganous), iron (III) acetylacetonate, copper acetylacetonate, zinc acetylacetonate, uranyl acetylacetonate, thorium acetylacetonate, strontium acetylacetonate, lead acetylacetonate and beryllium acetylacetonate.

At this time it is not clear why only certain of the metal acetylacetonates are such effective latent accelerators for epoxy-anhydride impregnating systems. In some instances, particularly with chromium acetylacetonate, very unexpectedly, gel times of an epoxy-anhydride system will decrease several weeks after the latent accelerator is added to the system.

It is believed that after several days a complex or adduct forms between the anhydride and the chromium compound to open the anhydride ring, producing a heat activated ionic species especially free to react with the epoxy. The reason why only selected metal acetylacetonates are useful with anhydride type systems may also be due in part to some type of metal acetylacetonate anhydride complex or adduct formation. It is believed that the cure mechanism is not a catalytic cure, as in the aforedescribed Markovitz teachings, where large quantities of metal acetylacetonate can be used with phenolic resin accelerator or alone as the sole catalyst, but rather a type of metal acetylacetonate-epoxy or anhydride adduct formation, followed by proton transfer from the adduct or other epoxy or anhydride molecules.

The useful, selected metal acetylacetonates must be mixed in critical proportions with the epoxy-anhydride system. The useful weight percent range of ingredients, to provide a good compromise of fluidity, cure time, storage life and electrical and mechanical properties is an epoxy:anhydride:selected metal acetylacetonate weight ratio of 100:25 to 200:0.002 to 1.00, with a preferred weight ratio of 100:75 to 150:0.01 to 0.50. Over 1.00 part of selected metal acetylacetonate per 100 parts of epoxy causes loss of fluidity and reduction of pot life; under 0.002 part of selected metal acetylacetonate causes excessively long gel times for high voltage coil applications.

One type of epoxy resin, which may be used in the invention, is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the chemical structural formula:

where n is an integer of the series 0, 1, 2, 3 . . . , and R represents the divalent hydrocarbon radical of the dihydric phenol. Typically R is:

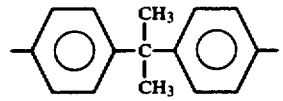

to provide a diglycidyl ether of bisphenol A type epoxide or

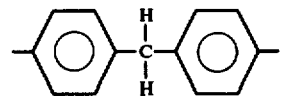

to provide a diglycidyl ether of bisphenol F type epoxide resin.

The bisphenol epoxides used in the invention have a 1, 2 epoxy equivalency greater than one. They will generally be diepoxides. By the epoxy equivalency, reference is made to the average number of 1, 2 epoxy groups,

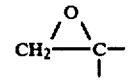

contained in the average molecule of the glycidylether. Typically, epoxy resins of bisphenol are readily available in commercial quantities and reference may be made to *The Handbook of Epoxy Resins*, by Lee and Neville for a complete description of their synthesis.

Other glycidylether resins that are useful in this invention include polyglycidylethers of a novolac. The polyglycidylethers of a novolac suitable for use in accordance with this invention are prepared by reacting an epihalohydrin with phenol formaldehyde condensates. While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

The product of the reaction is generally a massive oxidation resistant aromatic compound, one example of which is represented by the chemical structural formula:

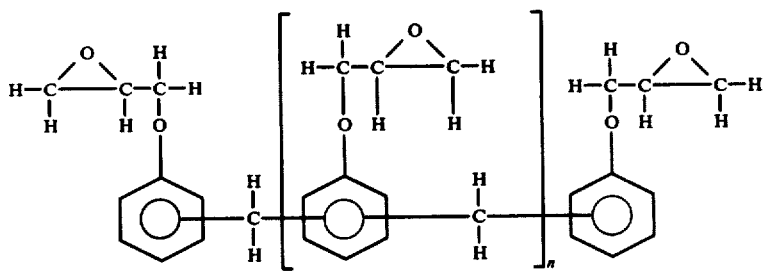

wherein n is an integer of the series 0, 1, 2, 3, etc.

Although epoxy novolac resins from formaldehyde are generally preferred for use in this invention, epoxy novolac resins from any other aldehyde such as, for example, acetaldehyde, chloraldehyde, butylaldehyde, fufuraldehyde, can also be used. Although the above formula shows a completely epoxidized novolac, other epoxy novolacs which are only partially epoxidized can be useful in this invention. An example of a suitable epoxy novolac is 2, 2, bis [p-(2,3-epoxypropoxy)-phenyl]-methane. These resins are well known in the art and reference may be made to The Handbook of Epoxy Resins for a complete description of their synthesis. Other useful epoxy resins include glycidyl esters, hydantoin epoxy resins, cycloaliphatic epoxy resins and diglycidyl ethers of aliphatic diols.

The glycidyl ester epoxy resins which can be employed in this invention are non-glycidyl ether epoxides containing more than one 1,2 epoxy group per molecule. They are characterized by substitution of the ester bond,

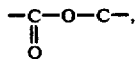

for the ether bond, —O—, and have the chemical structural formula:

where R is an organic radical substituent selected from the group consisting of R', R'—O—R', R'—COO—R' and mixtures thereof, where R' is selected from the group consisting of alkylene groups, having from about 1-8 carbon atoms, saturated cycloalkylene groups where the ring has 4 to 7 carbons and mixtures thereof, where n is from about 1-8.

The hydantoin epoxy resins which can be employed in this invention are based on hydantoin, a nitrogen-containing heterocyclic ring having the structure:

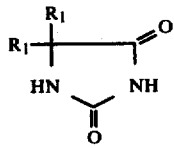

A wide variety of compounds can be formed by reacting the nitrogen positions in the five membered hydantoin ring. The hydantoin ring is readily synthesized from ketones, hydrogen, cyanide, ammonia, carbon dioxide and water. The epoxy resins are formed through reaction of the hydantoin with epichlorohydrin. Hydantoin rings can be linked together for form extended resins analogous in structure to bisphenol A. Polyfunctional resins can also be formed from these chain-extended materials by glycidylization of the hydroxyls and the remaining nitrogens. These heterocyclic glycidyl amine epoxy resins can be represented by the structural formula:

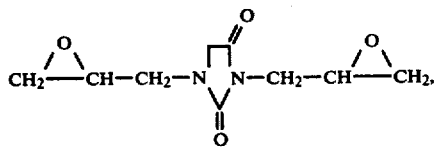

The cycloaliphatic type epoxides employed as the resin ingredient in the invention are selected from non-glycidyl ether epoxides containing more than one 1,2 epoxy group per molecule. These are generally prepared by epoxidizing unsaturated aromatic hydrocarbon compounds, such as cyclo-olefins, using hydrogen peroxide or peracids such as peracetic acid and perbenzoic acid. The organic peracids are generally prepared by reacting hydrogen peroxide with either carboxylic acids, acid chlorides or ketones to give the compound R—COOOH. These resins are well known in the art and reference may be made to Brydson, J., Plastic Materials, 1966, 471, for their synthesis and description.

Such non-glycidyl ether cycloaliphatic epoxides are here characterized by the absence of the ether oxygen bond, i.e.—O—, near the epoxide group, and are selected from those which contain a ring structure as well as more than one epoxide group in the molecule. The epoxide group may be part of the ring structure or may be attached to the ring structure. These epoxides may also contain ester linkages. These ester linkages are generally not near the epoxide group and are relatively unreactive, therefore these type materials are properly characterized as cycloaliphatic epoxides. The term "epoxide" as herein used is equivalent to the term "epoxy resin".

Examples of non-glycidyl ether cycloaliphatic epoxides would include 3,4-epoxycyclohexylmethyl-3,4-epoxycyclohexane carboxylate (containing two epoxide groups which are part of ring structures, and an ester linkage); vinyl cyclohexene dioxide (containing two epoxide groups, one of which is part of a ring structure); 3,4-epoxy-6-methylcyclohexyl methyl-3,4-epoxy-6-methylcyclohexane carboxylate and dicyclopentadiene, having the following respective structures:

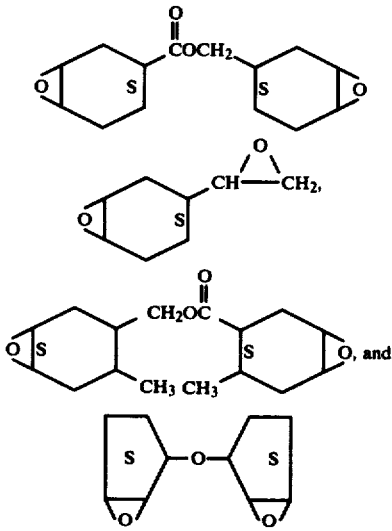

A distinguishing feature of many of the nonglycidyl ether cycloaliphatic epoxides is the location of the epoxy group(s) on a ring structure rather than on an aliphatic side chain. Generally, the cycloaliphatic epoxide particularly useful in this invention will have the formula selected from the group of:

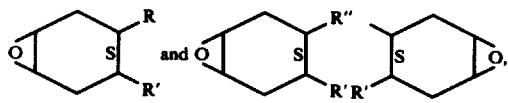

where S stands for a saturated ring structure, R is selected from the group consisting of $CHOCH_2$, $O(CH_2)_nCHOCH_2$ and $OC(CH_3)_2CHOCH_2$ radicals where n=1 to 5, R' is selected from the group consisting of hydrogen, methyl, ethyl, propyl, butyl and benzyl radicals and R" is selected from the group consisting of $CH_2OOC$, and $CH_2OOC(CH_2)_4COO$ radicals.

Other useful epoxy resins include diglycidyl ethers of an aliphatic diol having from 2 to 12 carbon atoms. There are low viscosity epoxy resins, usually monomers. Included are diglycidyl ethers of a glycol having from 2 to 12 carbon atoms between the glycidyl ether units, i.e., 2 to 12 carbons in the glycol unit, for example, diglycidyl ether of neopentyl glycol (DGENPG), diglycidyl ethers of 1,4 butane diol, diglycidyl ethers of ethylene glycol, and diglycidyl ethers of polyether glycols, such as, for example, diglycidyl ethers of triethylene glycol and diglycidyl ethers of tetraethylene glycol and their mixtures.

DGENPG is the preferred epoxy resin of this type. DGENPG is prepared by a two step process. The initial step reacts neopentyl glycol and epichlorohydrin in the presence of $BF_3$ to produce a chlorohydrid intermediate which is then dehydrohalogenated by sodium hydroxide or sodium aluminate to provide:

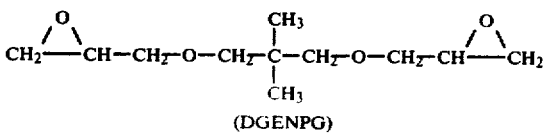
(DGENPG)

The use of diglycidyl ethers of an aliphatic diol as the only epoxy resin component provides resinous compositions having only about 15 cps. to 30 cps. initial viscosities at 25° C. They are extremely useful for very high voltage applications, i.e., about 20,000 to 30,000 volts, where thick multiple layers of mica insulation must be impregnated.

It is preferred to use some of these diglycidyl ethers of aliphatic diols in combination with the other epoxy resins, because the aliphatic diol epoxides are all low viscosity materials, generally between about 5 cps. to 60 cps. at 25° C., and help to reduce the viscosity of the resin impregnation composition. The epoxy resin system can consist of: (A) a first epoxy resin having a low viscosity (between about 5 to about 60 cps. at 25° C.) i.e., diglycidyl ethers of aliphatic diols and (B) another or second epoxy resin that has a high viscosity (above about 250 cps. and generally between about 250 cps. to about 20,000 cps. at 25° C.) i.e., bisphenol A, bisphenol F, novolacs, glycidyl esters, hydantoins, cycloaliphatics and their mixtures; in the weight ratio of diglycidyl ether of an aliphatic diol low viscosity epoxy resin:second epoxy resin having a high viscosity of from about 1.0:0.0 to about 1.0:4.0. The preferred range for most applications will be a range of low viscosity epoxy resin:high viscosity epoxy resin of from about 1.0:0.75 to about 1.0:1.25.

All of these epoxy resins can be characterized by reference to their epoxy equivalent weight, which is defined as the mean molecular weight of the particular resin divided by the mean number of epoxy radicals per molecule. In the present invention, all of the suitable epoxy resins will have a preferred epoxy equivalent weight of from about 100 to about 500 with a most preferred range of about 150 to about 250.

The organic, carboxylic acid anhydrides reactive with the epoxy, which are to be used in carrying out the invention, include the conventional organic mono- and polyfunctional anhydrides. Typical of the mono-functional anhydrides are hexahydrophthalic anhydride, 1-methylhexahydrophthalic anhydride, tetrahydrophthalic anhydride, 1-methyltetrahydrophthalic anhydride, phthalic anhydride, NADIC anhydride, NADIC methylanhydride, dodecenyl succinic anhydride and the like. Poly-functional anhydrides which may be employed include pyromellitic dianhydride, polyazelaic polyanhydride, the reaction product of trimetallic anhydride and a glycol, and benzophenone tetracarboxylic acid dianhydride. These organic anhydrides may be used singly or in admixture. The total anhydride content of the epoxy-anhydride mixture must lie within the range of from about 0.5 to about 1.5 anhydride equivalents for each epoxy equivalent.

For a number of special purposes unmodified epoxy resins may be considered to have certain disadvantages. These disadvantages may include high cost and too great a rigidity for specific applications. The epoxy resins may be modified by incorporation of epoxide diluents, flexibilizers and fillers. Effective amounts of a reactive epoxide diluent may be employed, generally between about 10 parts to 25 parts per 100 parts of the epoxy resins enumerated above, to further help reduce the viscosity of the mixed system. Diluents such as, for example, phenyl glycidyl ether, butylglycidyl ether, alkyl glycidyl ether, vinyl cyclohexanone dioxide, endo-dicyclopentadione dioxide, octylene oxide and their mixtures, can be used.

Epoxidized natural oil extenders, such as epoxidized linseed or soy bean oils, octyl epoxy tallate and reactive plasticizers such as the conventional phthalates and phosphates may also be used in small amounts, up to about 40 parts per 100 parts of epoxy resin to provide increased flexibility. Thixotropic agents, such as $SiO_2$ and asbestos in gel composition, and pigments such as $TiO_2$ may be used as aids in fluidizing the composition or enhancing the color tones of the cured resins. Similarly, various inorganic particulate fillers, such as silica, quartz, beryllium aluminum silicate, lithium aluminum silicate and mixtures thereof, in average particle sizes of from about 10 to 300 microns, may be employed in amounts up to about 100 parts per 100 parts of epoxy resin, to improve electrical properties of the resin formulation.

A closed full coil 10, prepared in accordance with the present invention, for insertion into an insulated high voltage electrical machine, such as an insulated high voltage electric motor or generator, is illustrated in FIG. 1. The full coil would be disposed within the slots of the stator surrounding the metal motor armature or generator rotor. The full coil comprises an end portion comprising a tangent 12, a connecting loop 14 and another tangent 16 with bare leads 18 extending therefrom. Slot portions 20 and 22 of the coil which sometimes are hot pressed to precure the resin and to form them to predetermined shape and size are connected to the tangents 12 and 16, respectively. These slot portions are connected to other tangents 24 and 26 connected through another loop 28. In general, generator coils are impregnated and then hot pressed prior to winding; motor coils are generally post impregnated "in situ".

The coils are placed the slots of the stator of an electrical machine and the end windings wrapped and tied together. The uninsulated leads are then soldered, welded or otherwise connected to each other or to the commutator. In the case of a motor, generally the entire motor containing the coils will be placed in an impregnating bath containing the impregnating resin of this invention and vacuum impregnated. Thereafter the impregnated motor is removed from the impregnating tank, drained, placed in an oven and heated to a temperature to cure the completely reactive composition in the coils.

In a high voltage A.C. motor or generator, the coil member may comprise a plurality of turns of round or rectangular metallic, electrical conductors, each turn of the conductor consisting essentially of a copper or aluminum strap 30 wrapped with turn insulation 31, as shown in FIG. 2. The turn insulation 31 would be disposed between the conductor straps 30 and the mica tape 32, and would generally be prepared from a fibrous sheet or strip impregnated with a resinous insulation.

While the turn insulation may consist solely of a coating of uncured varnish or resin, it can also comprise a wrapping of fibrous material treated with a cured resin. Glass fiber cloth, asbestos paper or mica paper treated with a cured resin may be used with equally satisfactory results. The resin applied to the turn insulations may be a phenolic resin, an alkyd resin, a melamine resin or the like.

The turn insulation is generally not adequate to withstand the severe voltage gradients that will be present between the conductor and ground when the coil is installed in a high voltage A.C. motor or generator. Therefore, ground insulation for the coil is provided by mica tape 32, which binds the entire coil of electrical conductors together. Preferably, a plurality of layers of composite mica tape 32, which may comprise mica flakes 36 bound to a flexible material 34, are wrapped about the coil to bind the electrical conductors together, with sixteen or more layers being used for high voltage coils of generators. A bonding tape 38, which is porous may be wound around the mica tape bound coil. The bonding tape may comprise a porous, open weave substrate of natural or synthetic fabric cloth, for example, cotton, polyethylene or polyethylene terephthalate, coated with a phenolic type resin.

The highly fluid resin of this invention is used to impregnate and coat the bonding tape and mica tape shown. The highly fluid resin of this invention may also be used to coat and completely impregnate a transformer having a magnetic core and electrical windings disposed about the core.

EXAMPLE 1

A resin formulation was made containing 50 grams of a liquid diglycidyl ether of bisphenol A epoxy resin, having an epoxy equivalent weight of 172 to 176 and a viscosity at 25° C. of 4,000 to 5,500 cps. (sold commercially by Dow Chemical Co. under the tradename DER-332), 50 grams of neopentyl diglycidyl ether epoxy resin (diglycidyl ether of neopentyl glycol) having an epoxy equivalent weight of 130 to 165 and a viscosity at 25° C. of 6 to 8 cps. (sold commercially by Ciba Geigy Co.), 105 grams of 1-methyltetrahydrophthalic anhydride and 0.20 gram of chromium (III) acetylacetonate as latent accelerator (to provide an epoxy resin:acid anhydride:selected metal acetylacetonate weight ratio of 100:105:0.20).

The components were poured into a container, stirred at room temperature and then put in a paint mixer for about five minutes. The initial viscosity of the sample was about 80 cps. at 25° C. After about four hours, ten gram samples were poured into flat 2" diameter aluminum dishes covered with a clock glass. Some of these samples were placed in a 150° C. forced air oven and others in a 175° C. forced air oven. Each sample was inspected every 10 to 20 minutes to record the gel time. The approximate gel time was considered to be the amount of time it took for formulation to start to solidify.

Storage properties of the formulation were found by measuring viscosities at 25° C. in Gardner-Holdt bubble tube viscometers (ASTM designation D154-56). Measurements were usually taken at one-week intervals. The termination of the storage lifetime (pot-life) of these formulations was considered to be when the viscosity reached a value of 1,000 cps. at 25° C. Over about 1,000 cps. it would be difficult to completely impregnate high voltage coils.

To evaluate the effect of the accelerators on the electrical properties of the cured resin, 2" diameter×⅛" to ¼" thick castings were cured in an oven using a heating cycle of 16 hours at 150° C., and 60 Hz power factors (100×tan ε) and dielectric constant values ε' were obtained at 150° C. (ASTM designation D150-65T). The results of these tests are recorded in TABLE 1 below.

EXAMPLE 2

A resin formulation was made using the same ingredients and amounts as EXAMPLE 1, but the samples were left to age for 2 weeks. The tests run as in EXAMPLE 1. The initial viscosity of the sample was about 80 cps. at 25° C. The results of these tests are recorded in TABLE 1 below.

EXAMPLE 3

Resin formulations were made using the same ingredients and amounts as in EXAMPLE 1, except that the following different metal acetylacetonates were used (to provide, in all cases, an epoxy resin:acid anhydride:-selected metal acetylacetonate weight ratio of 100:105:0.20)-titanyl (TiO) acetylacetonate (titanium oxyacetylacetonate); aluminum (III) acetylacetonate, manganese (III-manganic) acetylacetonate, cobalt (II) acetylacetonate, cobalt (III) acetylacetonate, nickel (II) acetylacetonate, vanadium (III) acetylacetonate, zirconium (IV) acetylacetonate, sodium (I) acetylacetonate, and potassium (I) acetylacetonate. After about four hours, the samples were tested as in EXAMPLE 1. The initial viscosity of all the samples was below 100 cps. at 25° C. The results of the tests are recorded in TABLE 1 below.

EXAMPLE 4

A resin formulation was made using the same ingredients as EXAMPLE 1 except that a liquid hydantoin epoxy resin having an epoxy equivalent weight of 130 to 145, and a viscosity at 25° C. of about 1,500 to 2,500 cps. (sold commmercially by Ciba-Geigy Co. under the tradename ARACAST 2793) was substituted for the bisphenol A epoxy resin. The component weight ratios were 100:105:0.10. After about four hours the sample was tested as in EXAMPLE 1. The initial viscosity of the sample was below 100 cps. at 25° C. The results of these tests are recorded in TABLE 1 below.

EXAMPLE 5

As a comparative example, resin formulations were made using the same epoxy and anhydride ingredients and amounts as in EXAMPLE 1, except that the following metal acetylacetonates were used (to provide, in all cases, an epoxy resin:acid anhydride:metal acetylacetonate weight ratio of 100:105:0.10)-cerous acetylacetonate, manganese acetylacetonate, magnesium acetylacetonate, copper acetylacetonate, zinc acetylacetonate, thorium acetylacetonate, strontium acetylacetonate, lead acetylacetonate, manganese (II-manganous) acetylacetonate (all of which had poor solubility i.e., less than 50% by weight of each acetylacetonate would dissolve in the resin formulation when added in the weight ratio of 0.10 part per 100 parts of epoxy resin), iron acetylacetonate, uranyl (UO$_2$) acetylacetonate and beryllium acetylacetonate. After about four hours, the samples were tested as in EXAMPLE 1.

The results of these tests are recorded in TABLE 1 below, where it can be seen that all of these samples have long gel times, i.e., over 50 minutes at 175° C., except acetylacetonates of zinc, iron and uranyl, which have short pot lives of 50 days, 10 days and 4 days, respectively. The majority of those samples having long gel times were only partly soluble in the resin formulation. None of these metal acetylacetonates were considered useful in a combination epoxy-anhydride impregnating composition that is to be used for insulating electrical members which are to be subjected to high voltage applications, such as high voltage coils for transformers.

EXAMPLE 6

To show the usefulness of other epoxies, a cycloaliphatic epoxy resin formulation was made containing 100 grams of 3,4-epoxycyclohexylmethyl-3,4-epoxycyclohexane carboxylate cycloaliphatic epoxy resin, having an epoxy equivalent weight of 133 and a viscosity at 25° C. of 350 to 450 cps. (sold commercially by Union Carbide Co. as ERL-4221), 100 grams of diglycidyl ether of neopentyl glycol epoxy resin, 220 grams of 1-methyltetrahydrophthalic anhydride and 0.2 gram of zirconium acetylacetonate (to provide a cycloaliphatic epoxy:acid anhydride:reactive diluent:selected metal acetylacetonate weight ratio of 100:105:0.12). After about four hours the sample was tested as in EXAMPLE 1. The initial viscosity of the sample was about 60 cps. at 25° C. The results of these tests are recorded in TABLE 1 below.

EXAMPLE 7

As a comparative example, a resin formulation was made using the same ingredients and amounts as in EXAMPLE 6, except that 5 parts of catechol phenolic resin accelerator was used per 200 parts of the epoxy resin mixture. After about four hours the sample was tested as in EXAMPLE 1. The initial viscosity of the sample was about 60 cps. at 25° C. The results of these tests are recorded in TABLE 1 below, where it can be seen that the addition of phenolic resin accelerator drastically reduced pot life.

EXAMPLE 8

A resin formulation was made using the same ingredients and amounts as in EXAMPLE 6 except that aluminum acetylacetonate was substituted for zirconium acetylacetonate. The results of these tests are recorded in TABLE 1 below.

EXAMPLE 9

To show usefulness of other epoxies, a series of formulations were made. A resin formulation was made using the same ingredients and amounts in EXAMPLE 1 except that 0.10 grams of chromium (III) acetylacetonate was used, and a liquid diglycidyl ether of bisphenol F epoxy resin, having an epoxy equivalent weight of 160 to 170 and a viscosity at 25° C. of 3,200 to 3,600 cps. (sold commercially by Dow Chemical Co. under the tradename XD-7818) was substituted for the bisphenol A epoxy. This provided an epoxy resin:acid anhydride:chromium acetylacetonate weight ratio of 100:105:0.10. After about four hours the sample was tested as in EXAMPLE 1. The initial viscosity of the sample was about 70 cps. at 25° C. The results of these tests are recorded in TABLE 1 below.

EXAMPLE 10

A resin formulation was made using the same ingredients and amounts as in EXAMPLE 9 except that a blend of bisphenol A and hydantoin epoxy resin was substituted for the bisphenol A. The bisphenol A-hydantoin epoxy blend had an epoxy equivalent weight of 155 to 165 and a viscosity at 25° C. of 4,500 cps. to 5,500 cps. at 25° C. (sold commercially by Ciba Geigy Co. under the tradename ARACAST XB-2826). A slightly larger amount of anhydride was also used. This provided an epoxy resin:acid anhydride:chromium acetylacetonate weight ratio of 100:120:0.10. After about four hours the sample was tested as in EXAMPLE 1. The initial viscosity of the sample was about 50 cps. at 25° C. The results of these tests are recorded in TABLE 1 below.

EXAMPLE 11

A resin formulation was made using the same ingredients and amounts as in EXAMPLE 9 except that the epoxy resin consisted only of 100 grams of neopentyl diglycidyl ether, with no bisphenol A epoxy. This provided a low viscosity diglycidyl ether of an aliphatic diol epoxy resin:acid anhydride:chromium acetylacetonate weight ratio of 100:120:0.10. After about four hours the sample was tested as in EXAMPLE 1. The initial viscosity of the sample was about 20 cps. at 25° C. The results are recorded in TABLE 1 below. As can be seen, this formulation provides not only good electrical, pot life and gel time properties, but also extremely low initial viscosities. This resin would be particularly useful for very high voltage impregnation applications, where as much as ten to sixteen layers of mica paper or mica tape must be penetrated.

ties for high voltage application. A great many of the acetylacetonates (cerous, magnesium, copper, zinc, thorium, strontium, lead and manganese (II)) are only partially soluble with the epoxy-anhydride system when added at 0.10 part per 100 parts epoxy, and most of these, and also beryllium, have overly long gel times at 150° C., so that void formation in the insulation of coils during curing is probable, with resultant poor performance in high voltage applications.

Some acetylacetonates (iron and uranyl) have excellent power factor values at 150° C., and excellent gel times at 150° C., but are stable for only a week or so, and thus not particularly useful commercially. Of those metal acetylacetonates tested and remaining, all are useful with the epoxide-anhydride system as insulation for high voltage members and devices, particularly chromium (III), manganese (III) and cobalt (III). Table 1 also shows that hydantoin; cycloaliphatic, bisphenol F resins, mixtures of bisphenol A and hydantoin epoxy resins and epoxies containing all diglycidyl ethers of an aliphatic diol are useful, and that phenolic resin accelerators are not.

FIG. 3 shows a graph of storage time vs. viscosity of preferred latent accelerators vs. iron and zinc acetylacetonates.

We claim:

1. An insulated electrical coil having a cured body of resinous insulation applied to the coil, the insulation comprising a cured resinous composition consisting

TABLE 1

| Metal Acetylacetaonate | Gel Time (min.) | | Pot Life (days) 25° C. | Electrical Properties 150° C. | | |
|---|---|---|---|---|---|---|
| | 150° C. | 175° C. | | Thickness (in.) | 100 tan δ | δ' |
| chromium (III) | 35 to 45 | 15 | 200 | 0.24 | 4.3 | 7.4 |
| chromium (III)[a] | 20 to 25 | 15 | 200 | 0.24 | 4.3 | 7.4 |
| titanyl (T10) | 35 to 40 | 30 to 35 | 110 | 0.23 | 2.4 | 6.7 |
| aluminum (III) | 35 to 40 | 30 to 35 | 95 | 0.22 | 2.5 | 6.9 |
| manganese (III) | 60 to 90 | 40 to 45 | 160 | 0.20 | 5.3 | 7.4 |
| cobalt (II) | 50 to 55 | 35 to 4 | 130 | 0.21 | 2.8 | 6.6 |
| cobalt (III) | 80 to 90 | 25 to 35 | 200 | 0.20 | 2.2 | 6.9 |
| nickel (II) | 60 to 90 | 45 to 50 | 90+ | 0.19 | 2.2 | 6.7 |
| vanadium (III) | 70 to 80 | 40 to 45 | 90+ | 0.10 | 1.8 | 6.5 |
| zirconium (IV) | 50 to 55 | 30 to 35 | 90+ | 0.11 | 4.7 | 7.6 |
| sodium (I) | 35 to 40 | 20 to 25 | 90+ | 0.12 | 12.0 | 7.9 |
| potassium (I) | 25 to 30 | 15 to 20 | 90+ | 0.12 | 27.0 | 8.4 |
| chromium (III)[b] | 35 to 40 | 15 to 25 | 90+ | 0.27 | 7.0 | 6.9 |
| *cerous[c] | 75+ | 50 to 55 | C | 0.16 | 8.0 | 6.9 |
| *magnesium[c] | 75+ | 50 to 55 | C | 0.23 | 1.8 | 7.1 |
| *copper[c] | 75+ | 90 to 100 | C | 0.21 | 310.0 | 19.0 |
| *zinc[c] | 35 to 45 | 20 t0 25 | 50 | 0.23 | 112.0 | 9.8 |
| *thorium[c] | 60 to 65 | 50 to 55 | C | C | C | C |
| *strontium[c] | 100 to 110 | 60 to 65 | C | C | C | C |
| *lead[c] | 100 to 110 | 70 to 80 | C | C | C | C |
| *manganese (II)[c] | 75+ | 55 to 65 | C | 0.16 | 43.0 | 6.8 |
| *iron | 15− | 15− | 10 | 0.10 | 1.6 | 6.4 |
| *uranyl (VO₂) | 10 | 10 | 4 | 0.13 | 15.0 | 7.9 |
| *beryllium | 100 to 110 | 60 to 65 | 90+ | — | — | — |
| zirconium (IV)[d] | 20 to 30 | 15− | 80 | 0.27 | 4.8 | 5.7 |
| *zirconium (IV)[e] | 20− | 15− | 6 | 0.29 | 7.1 | 6.9 |
| aluminum (III)[d] | 20 to 30 | 15− | 90+ | 0.28 | 4.7 | 6.4 |
| chromium (III)[f] | 35 to 40 | 15 to 25 | 90+ | 0.27 | 14.5 | 6.9 |
| chromium (III)[g] | 55 to 60 | 25 to 35 | 90+ | 0.27 | 5.4 | 7.2 |
| chromium (III)[h] | 60 | 25 to 35 | 90+ | 0.26 | 5.8 | 6.7 |

[a]aged two weeks.
[b]hydantoin epoxy resin substituted for bisphenol A in resin mixture.
[c]poor or partial solubility.
[c]poor or partial solubility.
[d]cycloaliphatic Cresin substituted for bisphenol A in the resin mixture.
[e]cycloaliphatic epoxy resin substituted for bisphenol A with addition of phenolic resin accelerator in the resin mixture.
[f]bisphenol F epoxy resin substituted for bisphenol A in the resin mixture.
[g]blend of bisphenol A and hydantoin epoxy resin in the resin mixture.
[h]use of a diglycidyl ether of an aliphatic diol as the resin.
*comparative examples.

As can be seen from these results, some acetylacetonates (copper, zinc and manganese (II)) have very poor power factor values, providing poor insulation properessentially of (1) 100 parts by weight of an epoxy resin mixture consisting essentially of: a first epoxy resin consisting of a diglycidyl ether of an aliphatic diol and a second epoxy resin selected from the group consisting of bisphenol A epoxy resins, bisphenol F epoxy resins, novolac epoxy resins, glycidyl ester epoxy resins, hydantoin epoxy resins, cycloaliphatic epoxy resins and mixtures thereof, (2) about 25 parts to 200 parts by weight of an organic carboxylic acid anhydride and (3) 0.002 part to 1.00 part of a metal acetylacetonate selected from the group consisting of chromium (III) acetylacetonate, titanyl acetylacetonate, aluminum (III) acetylacetonate, manganese (III) acetylacetonate, cobalt (II) acetylacetonate, cobalt (III) acetylacetonate, nickel (II) acetylacetonate, vanadium (III) acetylacetonate, zirconium (IV) acetylacetonate, sodium (I) acetylacetonate, potassium (I) acetylacetonate and mixtures thereof, acting as a latent catalyst.

2. The insulated electrical coil of claim 1, wherein the metal acetylacetonate is chromium (III) acetylacetonate.

3. The insulated electrical coil of claim 1, wherein the epoxy resins have an epoxy equivalent weight of from about 100 to about 500, the weight ratio of diglycidyl ether of an aliphatic diol:second epoxy resin is from about 1.0:0.75 to about 1.0:4.0, and 0.002 part to 0.50 part of chromium (III) acetylacetonate is added per 100 parts of epoxy resin.

4. The insulated electrical coil of claim 1, wherein the diglycidyl ether of an aliphatic diol has a viscosity of between about 5 cps. to about 60 cps. at 25° C., the second epoxy resin has a viscosity of between about 250 cps. to about 20,000 cps. at 25° C., and the diglycidyl ether of an aliphatic diol is selected from the group consisting of diglycidyl ethers of neopentyl glycol, diglycidyl ethers of 1,4 butane diol, diglycidyl ethers of ethylene glycol, diglycidyl ethers of polyether glycols and mixtures thereof.

5. The insulated electrical coil of claim 1 disposed about the magnetic core of a high voltage electrical transformer.

6. The insulated electrical coil of claim 1 disposed within the slots of a metal stator in a high voltage electrical motor.

7. The insulated electrical coil of claim 1 disposed within the slots of a metal stator in a high voltage electrical generator.

* * * * *